US006896431B2

(12) United States Patent
Lien et al.

(10) Patent No.: US 6,896,431 B2
(45) Date of Patent: May 24, 2005

(54) IDENTIFICATION CARD MANUFACTURING DEVICE MODULE UNIFICATION

(75) Inventors: Brent D. Lien, Minneapolis, MN (US); Ted M. Hoffman, Eden Prairie, MN (US); Gregory A. Lee, Minneapolis, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 0 days.

(21) Appl. No.: 10/419,055

(22) Filed: Apr. 18, 2003

(65) Prior Publication Data

US 2003/0231948 A1 Dec. 18, 2003

Related U.S. Application Data

(60) Provisional application No. 60/373,980, filed on Apr. 19, 2002.

(51) Int. Cl.[7] .............................. B41J 29/00; B41J 29/04; B29C 63/02
(52) U.S. Cl. ...................... 400/521; 400/541; 400/693; 347/108
(58) Field of Search ............................ 400/120.18, 691, 400/692, 693, 521, 541; 347/49, 108

(56) References Cited

U.S. PATENT DOCUMENTS

| | | | | |
|---|---|---|---|---|
| 5,220,343 A | * | 6/1993 | Takanashi et al. ............ | 347/212 |
| 5,266,781 A | | 11/1993 | Warwick et al. ............. | 233/375 |
| 5,600,362 A | | 2/1997 | Morgavi et al. ............. | 347/218 |
| 5,820,277 A | * | 10/1998 | Schulte ....................... | 400/223 |
| 6,094,209 A | * | 7/2000 | Nardone et al. ............. | 347/171 |
| 6,095,220 A | * | 8/2000 | Kobayashi et al. .......... | 156/540 |
| 6,105,861 A | | 8/2000 | Kuit ............................ | 235/375 |
| 2001/0053947 A1 | | 12/2001 | Lenz et al. .................. | 700/117 |
| 2003/0152409 A1 | * | 8/2003 | Pribula et al. ............... | 400/718 |
| 2004/0047667 A1 | * | 3/2004 | Huggins et al. .............. | 400/88 |
| 2004/0126173 A1 | * | 7/2004 | Bouverie et al. ............ | 400/693 |

FOREIGN PATENT DOCUMENTS

| | | | | |
|---|---|---|---|---|
| JP | 03247477 A | * | 11/1991 | ............ B41J/29/00 |
| JP | 07039644 A | * | 2/1995 | ............. A63F/9/22 |
| JP | 11268457 A | * | 10/1999 | ........... B42D/15/10 |
| JP | 11300830 A | * | 11/1999 | ........... B29C/63/02 |
| WO | WO 9619355 A1 | * | 6/1996 | ........... B42D/15/10 |

OTHER PUBLICATIONS

Machine translation of JP 11–300830 to Toppan Printing Co. from Japanese Patent Office website.*
Machine translation of JP 07–39644 to Takase et al. from Japanese Patent Office website.*
International Search Report for International Application No. PCT/US 03/12106 filed Apr. 18, 2003 dated Aug. 28, 2003.

* cited by examiner

*Primary Examiner*—Daniel J. Colilla
(74) *Attorney, Agent, or Firm*—Westman, Champlin & Kelly

(57) ABSTRACT

An identification card manufacturing system that includes first and second identification card manufacturing device modules and a unification mounting. The first identification card manufacturing device module includes a first card transport mechanism and an output, through which the card transport mechanism is configured to discharge individual cards. The second identification card manufacturing device module includes a second card transport mechanism and an input, at which the second card transport mechanism is configured to receive cards. The unification mounting positions the output of the first device module in card handoff alignment with the input of the second device module.

25 Claims, 7 Drawing Sheets

IDENTIFICATION CARD MANUFACTURING DEVICE MODULE UNIFICATION

The present application claims the benefit of U.S. provisional patent application Ser. No. 60/373,980, filed Apr. 19, 2002, the content of which is hereby incorporated by reference in its entirety.

FIELD OF THE INVENTION

The present invention generally relates to identification card manufacturing systems and, more particularly, to the unification of separate identification card manufacturing device modules to form a unified identification card manufacturing system.

BACKGROUND OF THE INVENTION

Identification cards are commonly used as a vehicle for identifying the bearer of the card (e.g., driver's licenses) for access control, and other purposes. These identification cards are produced using identification card manufacturing systems, such as those produced by Fargo Electronics, Inc. of Eden Prairie, Minn.

Identification card manufacturing systems generally utilize separate identification card manufacturing or processing devices. These devices typically include an identification card printer, an identification card laminator, a card flipper, a data encoder, and other card processing devices.

In order to simplify the card manufacturing process, it would be beneficial to link separate identification card manufacturing devices together to eliminate the need to load cards into each of the devices for processing. One of the difficulties in forming such a unified system is the need to accurately position the devices relative to each other to allow processed cards from one device to be handed off to the other device for additional processing.

SUMMARY OF THE INVENTION

The present invention generally allows for the unification of separate identification card manufacturing device modules by providing card handoff alignment therebetween. One aspect of the present invention is directed to an identification card manufacturing system that includes first and second identification card manufacturing device modules and a unification mounting. The first identification card manufacturing device module includes a first card transport mechanism and an output, through which the card transport mechanism is configured to discharge individual cards. The second identification card manufacturing device module includes a second card transport mechanism and an input, at which the second card transport mechanism is configured to receive cards. The unification mounting positions the output of the first device module in card handoff alignment with the input of the second device module. As a result, cards that are discharged through the output of the first device module by the first card transport mechanism are receivable at the input of the second device module for transport by the second card transport mechanism.

DETAILED DESCRIPTION OF THE PREFERRED EMBODIMENTS

Figure 1:
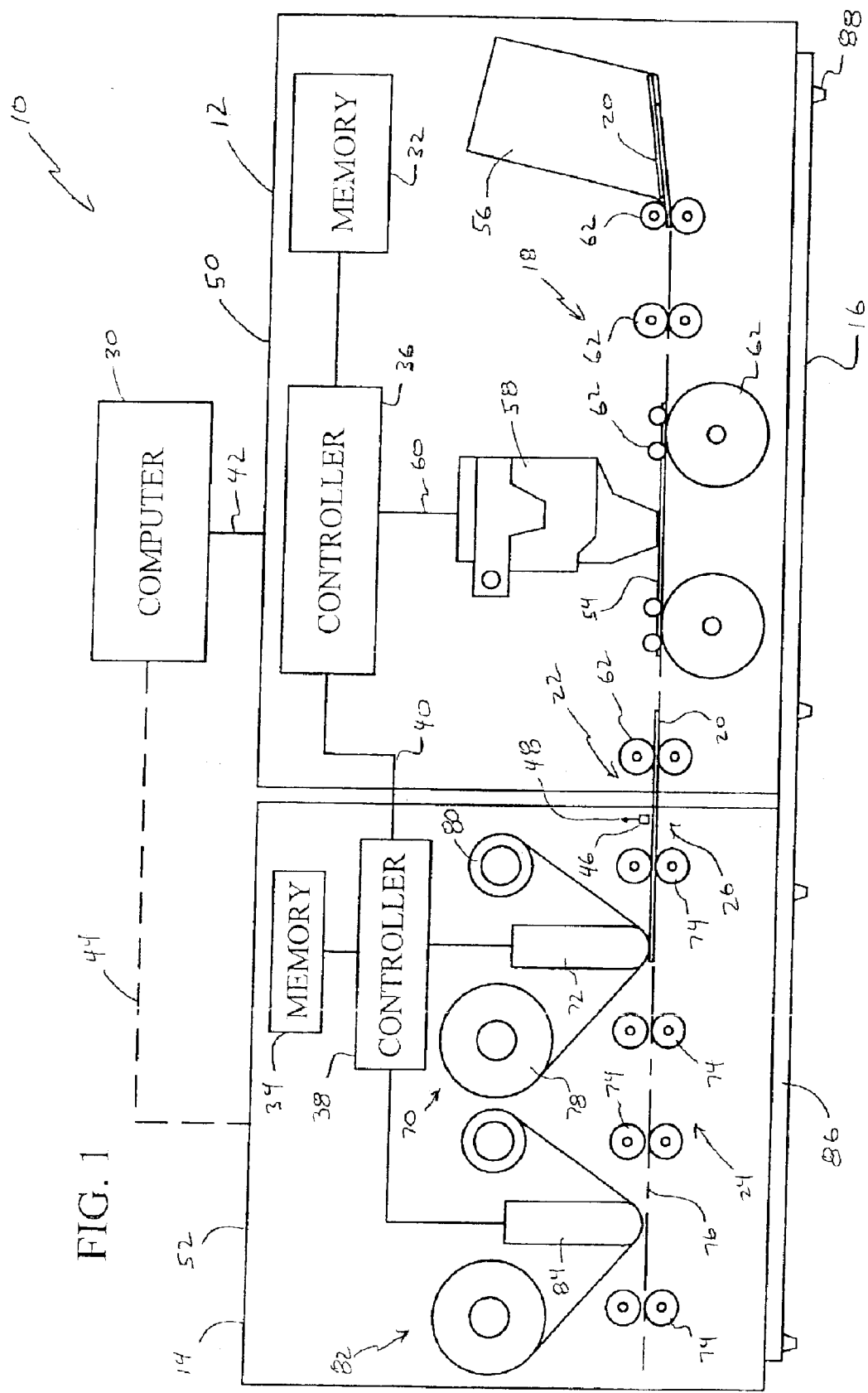
FIG. 1 is a schematic diagram of an identification card manufacturing system in accordance with embodiments of the invention.

FIG. 1 is a schematic diagram of an identification card manufacturing system 10 in accordance with embodiments of the present invention. System 10 generally includes a first identification card manufacturing device module 12, a second identification card manufacturing device module 14 and a unification mounting 16. First device module 12 includes a first card transport mechanism 18 that is configured to transport individual cards 20 through first device module 12 and discharge individual cards 20 through a card output 22. Second device module 14 includes a second card transport mechanism 24 that is configured to transport individual cards 20 through second device module 14 that are received at a card input 26. Unification mounting 16 is configured to position card output 22 of first device module 12 in card handoff alignment with card input 26 of second device module 14. In this manner, cards 20 that have been processed by first device module 12 can be discharged through card output 22 by first card transport mechanism 18 and received by second card transport mechanism 24 at card input 26 for further processing by second device module 14.

The first and second device modules 12 and 14 are preferably operable as stand-alone devices that are controlled by card manufacturing applications running on computer 30. Alternatively, one or both of the first and second device modules 12 and 14 can include microcomputers for executing card manufacturing applications stored in memory of the first and second device modules 12 and 14, such as memories 32 and 34, respectively.

First device module 12 includes a controller 36 and second device module 14 includes a controller 38. Controllers 36 and 38 can be linked for communication therebetween as indicated by link 40, or configured for independent operation. When the controllers 36 and 38 are linked together, communication with computer 30 can be accomplished with a single communication link, such as link 42. When the controllers 36 and 38 are configured for independent operation, they can be linked to computer 30 through separate channels, such as link 42 for first device module 12 and link 44 (dashed line) for second device module 14. Alternatively, communications with computer 30 can be provided through a common hub (not shown). Similarly, power to the first and second device modules 12 and 14 can be provided separately or through one of the device modules 12 or 14.

When configured to operate independently, second device module 14 can include a sensor 46 that operates to detect the feeding of a card 20 from card output 22 of first device module 12. Sensor 46 includes an output signal 48 that is used by controller 38 to control card transport mechanism 24 to receive the fed card 20 for processing by second device module 14.

Various types of identification card manufacturing device modules can be used to form system 10. To simplify the discussion of the present invention, the identification card manufacturing system 10 will be described as utilizing an identification card printer module 50 as first identification card manufacturing device module 12, and an identification card laminator module 52 as second identification card manufacturing device module 14, as shown in FIG. 1. It should be understood, however, that other devices can be substituted for first and second device modules 12 and 14, such as a card flipper, a data encoder for writing data to a magnetic stripe or memory chip of a card 20, and other card processing devices. Additionally, although only two device modules are depicted as forming system 10, it should be understood that additional device modules can be added in accordance with the present invention to form a "train" of identification card manufacturing device modules that form system 10.

Identification card printer module 50 is configured to print on a surface 54 of individual cards 20 in accordance with known methods. Printer module 50 includes a card supply 56, a print mechanism 58, card transport mechanism 18, and controller 36. Controller 36 is configured to control the components of printer module 50 through a Universal Serial Bus (USB), as shown at 60, or other suitable physical or wireless communication links. Printer module 50 also includes memory 32 that is accessible by controller 36. Card supply 56 can be a card cartridge (shown) or a card hopper configured to hold a stack of cards 20. Card transport mechanism 18 can include a plurality of feed rollers 62 that operate to deliver individual card substrates 20 from card supply 56 along a card transport path 64 to print mechanism 58 for printing an image on surface 54 of the card 20. Print mechanism 58 can be a thermal printhead utilizing a thermal print ribbon supply, an ink jet printhead utilizing an ink supply, or other suitable print mechanism.

Identification card laminator module 52 generally includes a supply of overlaminate material 70, card transport mechanism 24, a laminating mechanism 72 and controller 38. The components of laminator module 52 are generally controlled by controller 38. Alternatively, either controller 36 of printer module 50 or controller 38 of laminator module 52, can be configured to control the components of both printer module 50 and the components of laminator module 52.

Card transport mechanism 24 includes multiple feed and pinch rollers 74 that are configured to receive cards 20 at card input 26 from card output 22 of printer module 50. Card transport mechanism 24 feeds the individual cards 20 along card transport path 76 to laminating mechanism 72.

The supply of overlaminate material 70 includes a supply role 78 of overlaminate material that is fed between a transported card 20 and the laminating mechanism 72 and to a take-up roll 80. The laminating mechanism 72 can include a laminating roller that applies heat to the overlaminate material, which causes a portion of the overlaminate material to adhere to a surface of the card 20.

In accordance with one embodiment of the invention, laminator module 52 includes two or more supplies of overlaminate material and corresponding laminating mechanisms. In the depicted example of FIG. 1, a second supply of overlaminate material 82 and a second laminating mechanism 84 are provided. This arrangement allows for the use of different overlaminate materials, or redundant supplies of the same overlaminate material, which reduces the frequency at which the overlaminate supply must be replaced, as compared to laminators having single overlaminater supplies. The identification card printer module 50 can be similarly modified to include multiple card supplies 56, print mechanisms 58, and print consumables.

In accordance with one embodiment of the invention, unification mounting 16 includes a unitary plate 86 that is attached to first and second device modules 12 and 14 using appropriate fasteners, as shown in FIG. 1. Unitary plate 86 fixes the relative positions of card output 22 of first device module 12 and card input 26 of second device module 14 for card handoffs therebetween. Support feet 88 that are preferably formed of rubber can be attached to the bottom of unification mounting 16 and/or to the first and second device modules 12 and 14. Support feet 88 operate to prevent damage to the surface on which the system 10 is set and to level system 10.

Figure 2:
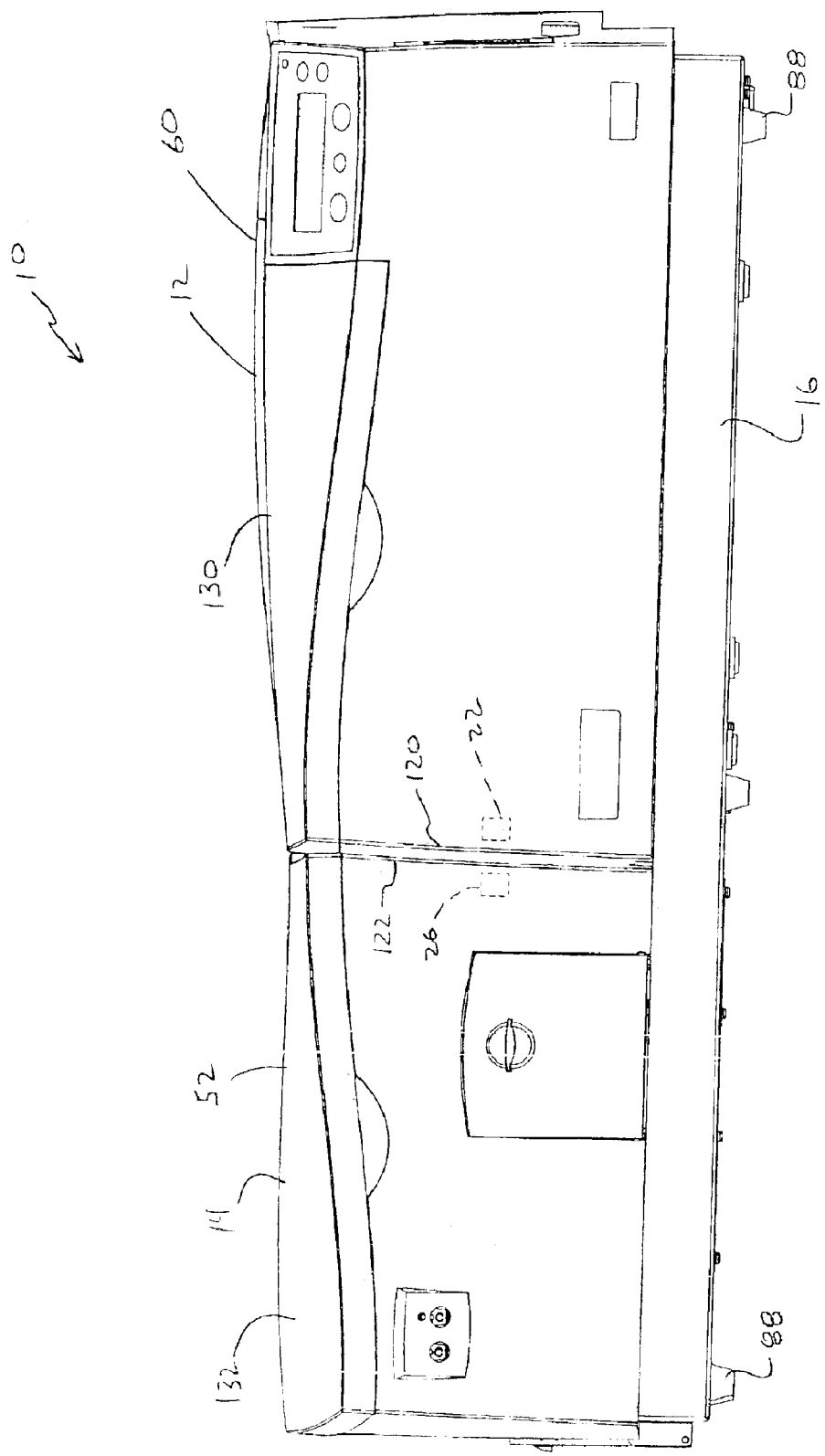
FIG. 2 is a front view of an identification card manufacturing system utilizing a unification mounting in accordance with embodiments of the invention.
Figure 3:
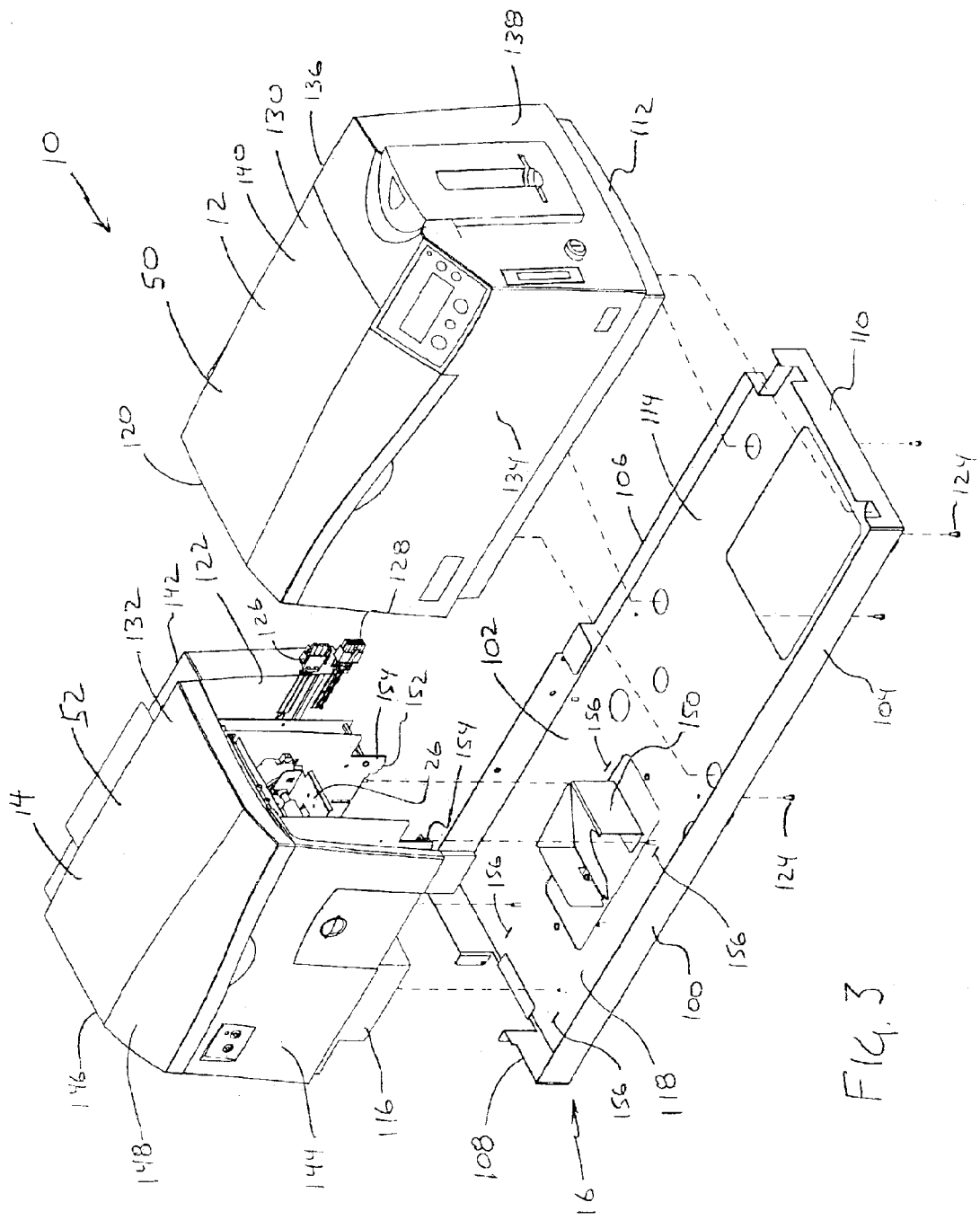
FIG. 3 is an exploded view of an identification card manufacturing system utilizing a unification mounting in accordance with embodiments of the invention.

FIGS. 2 and 3 are front and exploded perspective views of system 10 in accordance with another embodiment of unification mounting 16, which includes a tray 100 that operates to position printer module 50 and laminator module 52 in card handoff alignment. Tray 100 generally includes a base plate 102, a pair of opposing side walls 104 and 106, and a pair of opposing end walls 108 and 110. Tray 100 is sized to receive a printer base 112 at end 114 and a laminator base 116 at an end 118. Preferably, printer base 112 and laminator base 116 are received in the respective ends 114 and 118 with only a small amount of clearance between side walls 104 and 106 and end walls 108 and 110, to place an output side 120 of printer module 50, where card output 22 is located, in close proximity to an input side 122 of laminator module 52 where card input 26 is located to ensure proper card handoff alignment between output 22 and input 26. Fasteners 124 can be used to secure printer module 50 and laminator module 52 to base plate 102 of tray 100. Power and/or communications between printer module 60 and laminator module 62 can be provided through suitable cables 126 and 128.

Printer module 50 and laminator module 52 include housings 130 and 132, respectively. Printer housing 130 includes side walls 134 and 136, and end wall 138, and a top cover 140 that can be opened to access the components of printer module 50. Printer housing 130 attaches to the base 112 that is preferably recessed from the side walls 134 and 136 and the end wall 138 to allow side walls 134 and 136 to be substantially flush with the walls of tray 100. Printer base 112 can include a bottom plate or utilize the base plate 102 of tray 100.

Laminator housing 132 includes side walls 142 and 144, and end wall 146 and a top cover 148 that can be opened to provide access to the components of laminator module 52. Base 116 of laminator module 52 can include a bottom plate (not shown), or utilize base plate 102 of tray 100 as a bottom plate. Accordingly, base plate 102 can include components such as a card hopper 150 that is utilized by laminator module 52. Proper positioning and securing of laminator module 52 on base plate 102 of tray 100 can be further provided by the insertion of tabs 152 of legs 154 of laminator module 52 into slots 156 of base plate 102.

The shape of tray 100 can be adjusted to provide proper horizontal and vertical alignment of card output 22 of printer module 50 and card input 26 of laminator module 52. Thus, depending on the configuration of the printer and laminator bases 112 and 116, tray 100 can have a shape that differs from the rectangular shape depicted in FIG. 3. Accordingly, side walls 104 and 106 can be shifted to align the card output 22 of printer module 50 to the card input 26 of laminator module 52. Additionally, base plate 102 of tray 100 can have a non-uniform height between ends 114 and 118 to provide the desired vertical alignment between card output 22 of printer module 50 and card input 26 of laminator module 52. The horizontal shifting of the side walls of tray 100 and the vertical shifting of the base plate 102 can be accomplished by separating the tray 100 into separate printer and laminator portions, which are then joined by appropriate brackets to provide the desired card handoff alignment between the printer and laminator modules 50 and 52.

When base plate 102 of tray 100 forms the bottom plate of laminator module 52, laminator module 52 can be configured to operate with printer module 50 having varying vertical locations of the card output 22 by including stand-offs that attach to base plate 102 and receive legs 154 to raise the height of input 26 of laminator module 52.

Figure 4:
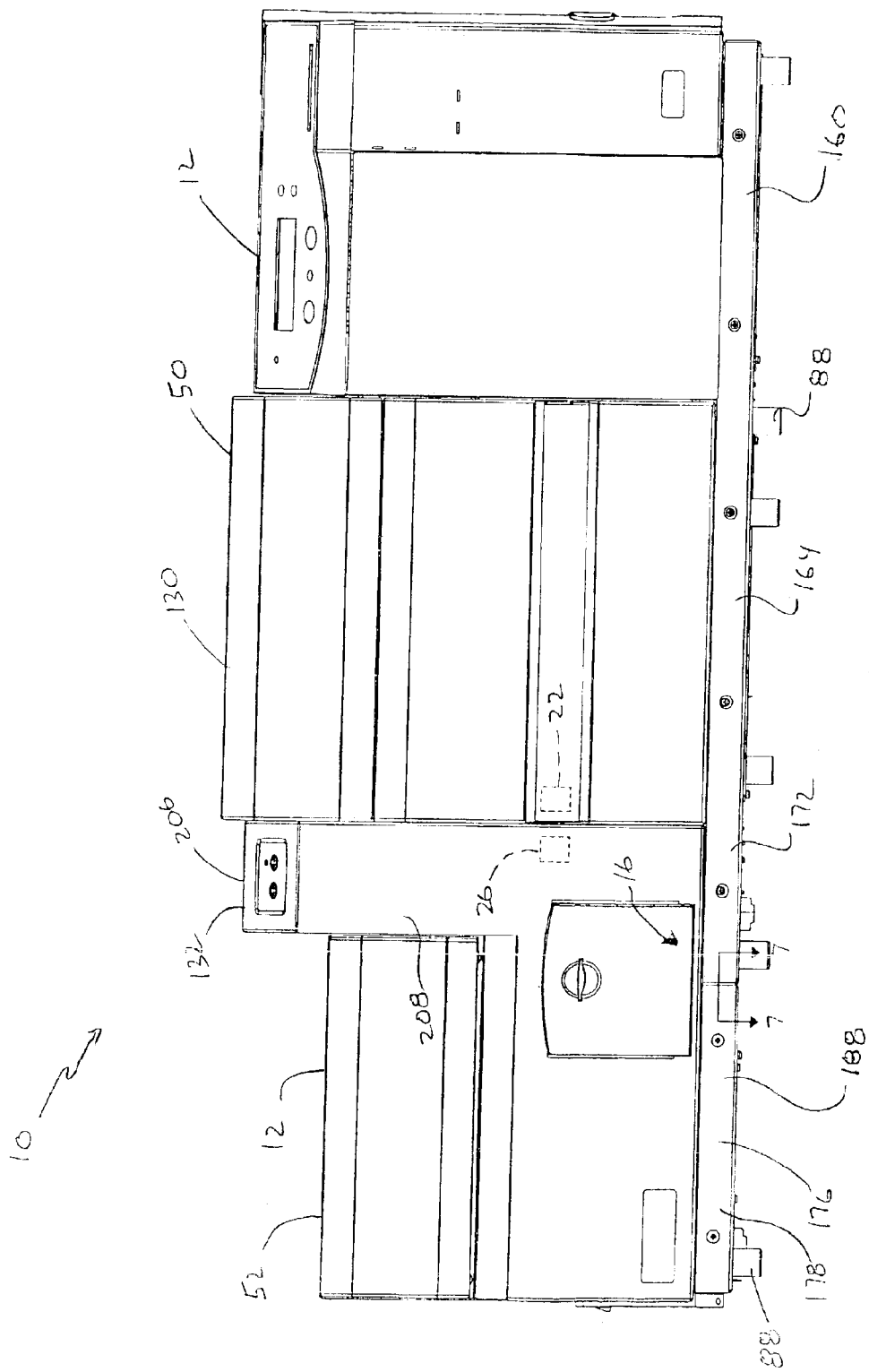
FIG. 4 is an assembled front view of an identification card manufacturing system utilizing a unification mounting in accordance with embodiments of the invention.
Figure 5:
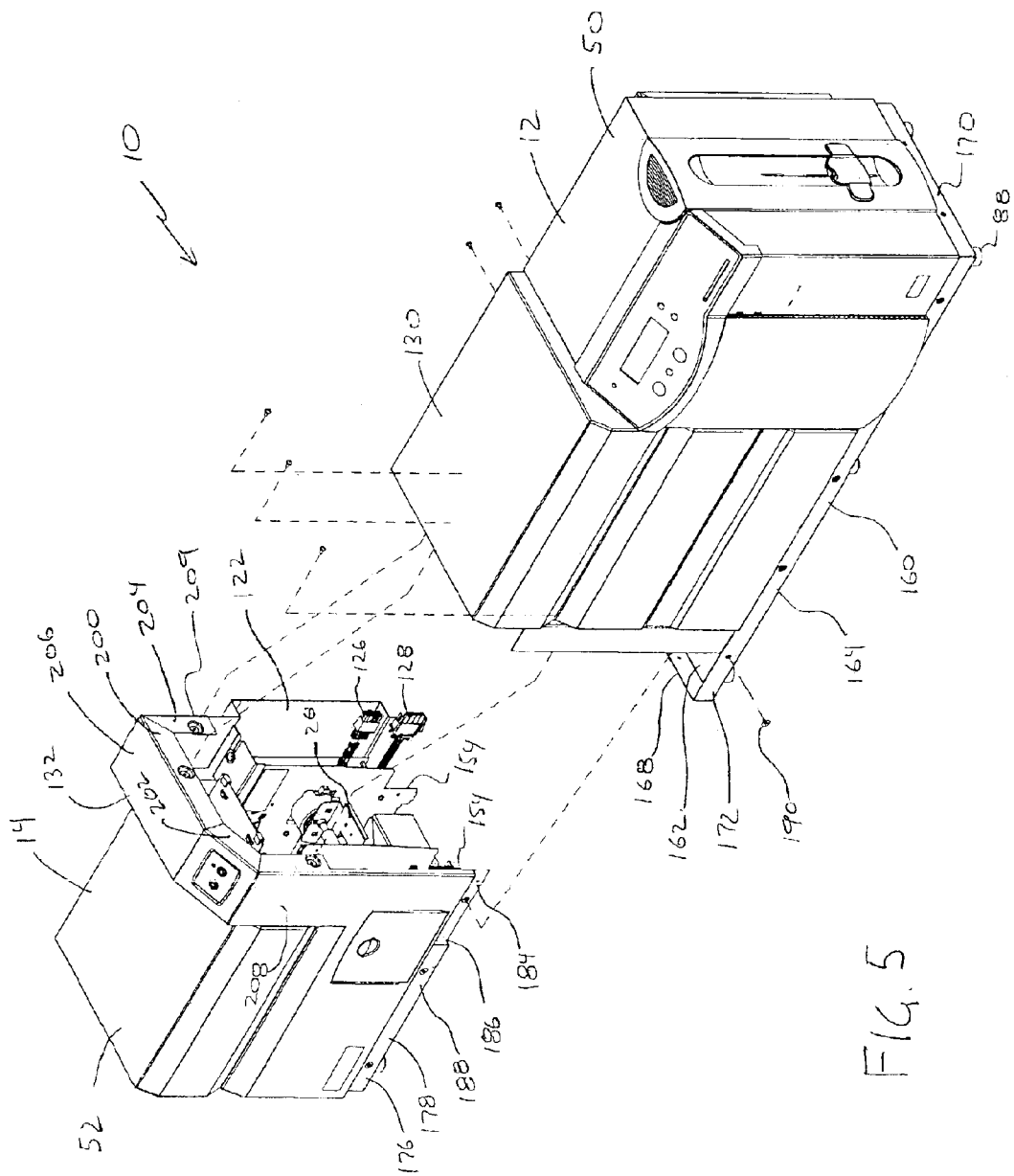
FIG. 5 is a front exploded perspective view of an identification card manufacturing system utilizing a unification mounting in accordance with embodiments of the invention.
Figure 6:
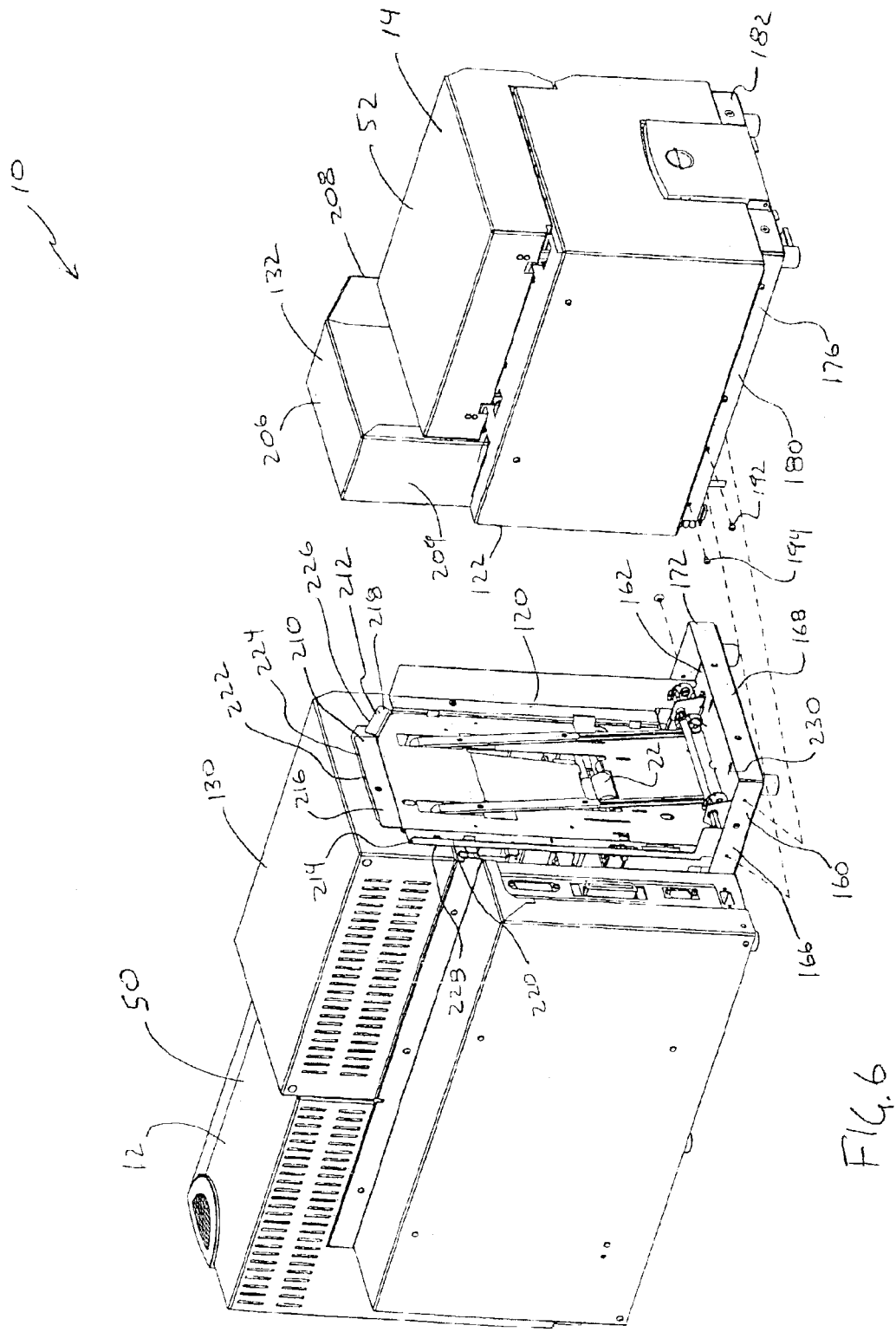
FIG. 6 is a rear exploded perspective view of an identification card manufacturing system utilizing a unification mounting in accordance with embodiments of the invention.

Another embodiment of the unification mounting 16 will be discussed with reference to FIGS. 4–6. FIG. 4 is an assembled front view of the system 10, FIG. 5 is a front exploded perspective view of the system 10, and FIG. 6 is a rear exploded perspective view of the system 10. Printer and laminator modules 50 and 52 generally include the card processing components discussed above with reference to FIG. 1. Additionally, printer and laminator modules 50 and 52 include the same or similar elements discussed above with respect to FIGS. 2 and 3, which are designated by the same or similar numbers.

Printer module 50 includes a printer base 160 having a base plate 162, a pair of opposing side walls 164 and 166, and a pair of opposing end walls 168 and 170. Unification mounting 16 includes a base extension 172 of printer base 160 that extends beyond the housing 130 of printer module 50. During stand-alone operation of the printer module 50, a card hopper (not shown) can be received by the base extension 172 at output end 120 to collect processed cards at the card output 22 of printer module 50. Although the base extension 172 is depicted as being integral to printer base 160, base extension 172 can be formed as a separate component.

Laminator module 52 includes a base 176 comprising opposing side walls 178 and 180, and an end wall 182 opposite input end 122. Input end 122, at which card input 126 is located, is received by base extension 172 of printer base 160 for card handoff alignment between the card output 22 of printer module 50 and the card input 26 of laminator module 52.

Figure 7:
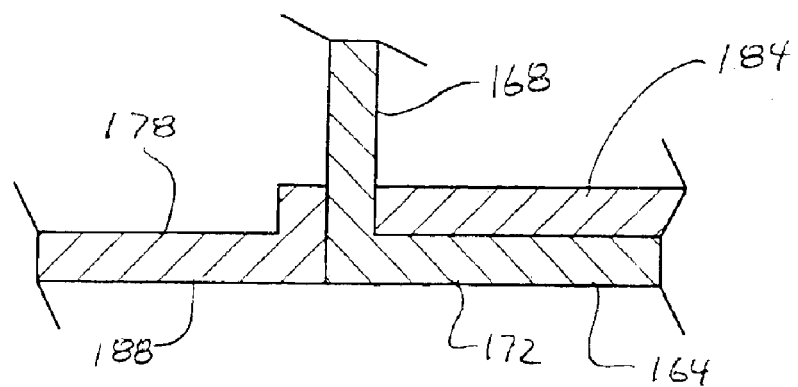
FIG. 7 is a partial cross-sectional view of a unification mounting that is taken approximately along line 7—7 of FIG. 4.

In accordance with one embodiment, the invention, at least one side wall of laminator base 176 is received within base extension 172 adjacent a corresponding side wall of printer base 160. In the depicted example of system 10, side wall 178 of laminator base 176 includes a side wall extension 184 at the input end 120. The side wall extension 184 includes a notch 186 that straddles end wall 168 of base extension 172, as shown in the partial cross-sectional view of FIG. 7 that is taken approximately along line 7—7 of FIG. 4. Side wall extension 184 is recessed slightly from a front side wall portion 188 of side wall 178 to avoid interfering with side wall 164 of base extension 172. This arrangement allows the front side wall portion 188 to lie substantially coplanar with side wall 164 of printer base 160, as shown in FIGS. 4 and 7. The side wall extension 184 can be secured to base extension 172 by a suitable fastener 190, as illustrated in FIG. 5.

In accordance with another embodiment of the invention, at least one side wall of laminator base 176 is configured to extend alongside a side wall of the base extension 172. This embodiment is illustrated in FIG. 6 where rear side wall 180 of laminator base 176 extends alongside side wall 166 of base extension 172. Fasteners 192 and 194 can extend through apertures of side walls 180 and 166 to secure printer and laminator modules 50 and 52 together in proper card handoff alignment.

In accordance with yet another embodiment of the invention, the unification mounting 16 includes cooperating connecting tabs and connecting tab receivers to secure the printer and laminator modules 50 and 52 together in proper card handoff alignment. As shown in FIGS. 5 and 6, laminator module 52 includes three connecting tabs 200, 202 and 204 that extend into the input end 122. The connecting tabs 202 and 204 are formed as members of top 206 and side walls 208 and 209, respectively, of laminator housing 132. Output end 120 of printer module 50 includes corresponding connecting tab receivers 210, 212 and 214 that are configured to receive the corresponding connecting tabs 200, 202 and 204 of laminator module 52. Connecting tab receivers 210, 212 and 214 are formed by respective tab members 216, 218 and 220. A gap 222 is formed between tab member 216 and printer housing 130 of connecting tab receiver 210 to form a slot 224 for receiving corresponding connecting tab 200 of laminator module 52. Likewise, slots 226 and 228 are formed between tab members 218 and 220 of connecting tab receivers 212 and 214 at output end 120 of printer housing 130. Slots 226 and 228 are configured to respectively receive connecting tabs 202 and 204 of printer module 52.

System 10 is formed by dropping laminator module 52 down upon base extension 172 with the side wall extension 184 falling within base extension 172 adjacent side wall 164 such that side wall extension 184 straddles end wall 168. Additionally, a support leg 154 is preferably received by a slot 230 of base plate 162 of base extension 172. Support leg 154 provides additional vertical support to laminator module 52 and ensures proper card handoff alignment between printer and laminator modules 50 and 52. Also, connecting tabs 200, 202 and 204 are received by their corresponding connecting tab receivers 210, 212 and 214, which operate to bring output end 120 of printer module housing 130 and input end 122 of laminator module housing 132 together as shown in FIG. 4. In this manner, printer and laminator modules 50 and 52 are joined together to form system 10 such that card output 22 of printer module 50 is in card handoff alignment with card input 26 of laminator module 52.

Although the present invention has been described with reference to preferred embodiments, workers skilled in the art will recognize that changes may be made in form and detail without departing from the spirit and scope of the invention. For example, the components of the unification mounting described herein can be rearranged such that the components illustrated as being connected to the first identification card manufacturing device module are attached to the second identification card manufacturing device module and vice versa. For example, the base extension of the unification mounting can be formed as a component of the laminator base as opposed to the printer base. Likewise, the connecting tabs could be formed at the output end of the printer module with the corresponding connecting tab receivers formed as components of the laminator module at the input end.

What is claimed is:

1. An identification card manufacturing system comprising:

a first device module including a housing, a first card transport mechanism and an output, the card transport mechanism configured to discharge individual cards through the output;

a second identification card manufacturing device module including a second card transport mechanism and an input, the second card transport mechanism configured to transport cards received at the input; and a unification mounting including a base extension of a first base that extends beyond the housing of the first device module and is joined to a second base of the second device module, the unification mounting positioning the output of the first device module in card hand-off alignment with the input of the second device module, whereby cards discharged through the output of the first device module by the first card transport mechanism are receivable at the input of the second device module for transport by the second card transport mechanism.

2. The system of claim 1, wherein:

the first device module is an identification card printer module configured to print on a surface of individual identification cards; and the second device module is an identification card laminator module configured to laminate an overlaminate material to a surface of a card.

3. The system of claim 1 including support feet attached to the first and second bases.

4. The system of claim 1, wherein:

the base extension of the first base includes a side wall; and the second base includes a side wall that is coplanar with the side wall of the base extension.

5. The system of claim 4, wherein:

the base extension of the first base includes an end wall; and the second base includes a side wall extension that straddles the end wall and extends alongside the side wall of the first base.

6. The system of claim 1, wherein:

the base extension of the first base includes an end wall; and the second base includes a side wall extension that straddles the end wall of the base extension.

7. The system of claim 1, wherein:

the second device module includes an input and having a connecting tab;

the first device module includes an output and having a connecting tab receiver having a slot that is configured to receive the connecting tab; and a fastener extending through the connecting tab and the connecting tab receiver.

8. An identification card printing and laminating system comprising:

an identification card printer module configured to print on a surface of individual identification cards, the printer module having a housing and an output through which cards are discharged;

an identification card laminator module configured to laminate an overlaminate material to a surface of a card received at an input; and a unification mounting including a base extension of a printer base of the printer module that extends beyond the housing and is joined to a laminator base of the laminator module, the unification mounting positioning the output of the printer module in card hand-off alignment with the input of the laminator module, whereby cards discharged through the output of the printer module are received by the input of the laminator module.

9. The system of claim 8, including fasteners securing the base extension to the laminator base.

10. The system of claim 8 including support feet attached to the printer and laminator bases.

11. The system of claim 8, wherein the identification card printer module includes:

a card supply containing a stack of individual cards;

a print mechanism configured to print on a surface of individual cards; and a transport mechanism configured to present individual cards to the print mechanism for printing and discharge the printed cards through the output.

12. The system of claim 8, wherein the identification card laminator module includes:

a supply of overlaminate material;

a laminating roller configured to laminate the overlaminate material to a surface of a card;

a transport mechanism configured to receive individual cards from the output of the printer module at the input, and present the cards to the laminating roller for laminating.

13. The system of claim 8, wherein:

the base extension of the printer base includes a side wall; and the laminator base includes a side wall that is coplanar with the side wall of the base extension.

14. The system of claim 13, wherein:

the base extension of the printer base includes an end wall; and the laminator base includes a side wall extension that straddles the end wall and extends alongside the side wall of the printer base.

15. The system of claim 14 including a fastener extending through the side wall of the base extension and the side wall extension of the laminator base.

16. The system of claim 8, wherein:

the base extension of the printer base includes an end wall; and the laminator base includes a side wall extension that straddles the end wall of the base extension.

17. The system of claim 8, wherein:

the laminator module includes an input end having a connecting tab; and the printer module includes an output end having a connecting tab receiver having a slot that is configured to receive the connecting tab.

18. The system of claim 8, wherein the laminator module comprises:

a first supply of overlaminate material;

a first laminating roller configured to laminate the overlaminate material to a surface of a card; and a transport mechanism configured to receive individual cards from the output of the printer module and an input, and present the cards to the first laminating roller for laminating.

19. The system of claim 18, wherein the laminator module comprises:

a second supply of overlaminate material; and a second laminating roller configured to laminate the overlaminate material to a surface of a card;

wherein the transport mechanism is configured present cards to the second laminating roller for laminating.

20. An identification card manufacturing system comprising:

a first device module including a housing, a first card transport mechanism and an output, the card transport mechanism configured to discharge individual cards through the output;

a second device module including a second card transport mechanism and an input, the second card transport mechanism configured to transport cards received at the input; and a unification mounting including a base extension of a second base that extends beyond the housing of the second device module and is joined to a first base of the first device module, the unification mounting positioning the output of the first device module in card hand-off alignment with the input of the second device module, whereby cards discharged through the output of the first device module by the first card transport mechanism are receivable at the input of the second device module for transport by the second card transport mechanism.

21. The system of claim 20, wherein:

the first device module is an identification card printer module configured to print on a surface of individual identification cards; and the second device module is an identification card laminator module configured to laminate an overlaminate material to a surface of a card.

22. The system of claim 20, wherein:

the base extension of the second base includes a side wall; and the first base includes a side wall that is coplanar with the side wall of the base extension.

23. The system of claim 22, wherein:

the base extension of the second base includes an end wall; and the first base includes a side wall extension that straddles the end wall and extends alongside the side wall of the first base.

24. The system of claim 20, wherein:

the base extension of the second base includes an end wall; and the first base includes a side wall extension that straddles the end wall of the base extension.

25. The system of claim 20, wherein:

the second device module includes an input and having a connecting tab;

the first device module includes an output end having a connecting tab receiver having a slot that is configured to receive the connecting tab; and a fastener extending through the connecting tab and the connecting tab receiver.

* * * * *

UNITED STATES PATENT AND TRADEMARK OFFICE
CERTIFICATE OF CORRECTION

PATENT NO. : 6,896,431 B2
DATED : May 24, 2005
INVENTOR(S) : Brent D. Lien et al.

It is certified that error appears in the above-identified patent and that said Letters Patent is hereby corrected as shown below:

Column 7,
Line 50, cancel "and" and insert -- end --.

Signed and Sealed this

Sixth Day of December, 2005

JON W. DUDAS
*Director of the United States Patent and Trademark Office*